United States Patent Office 2,997,473
Patented Aug. 22, 1961

2,997,473
NEW 2-SUBSTITUTED PIPERAZINE DERIVATIVES WITH CENTRAL STIMULATING ACTIVITY
David Karel de Jongh, Heemstede, and Antonie Marie Akkerman, Hendrik Kofman, and George de Vries, Amsterdam, Netherlands, assignors to N.V. Nederlansche Combinatie voor Chemische Industrie, Amsterdam, Netherlands, a limited-liability company of the Netherlands
No Drawing. Filed July 6, 1959, Ser. No. 824,957
Claims priority, application Netherlands July 5, 1958
3 Claims. (Cl. 260—268)

This invention concerns new 2-substituted piperazine derivatives with central stimulating activity.

The compounds of the present invention have the general formula:

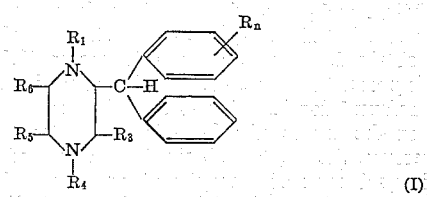

(I)

in which $R_1$ and $R_4$ are each selected from the group consisting of hydrogen and loweralkyl radicals containing no more than three carbon atoms; $R_3$, $R_5$ and $R_6$ are each selected from the group consisting of hydrogen and loweralkyl radicals containing no more than five carbon atoms, while $R_n$ represents one or more substituents selected from the group consisting of hydrogen, halogen, loweralkyl and lower-alkoxy radicals containing no more than five carbon atoms. These compounds are valuable central stimulants.

The compounds of the general Formula I may be prepared starting from the corresponding $\alpha,\alpha$-diphenyl 2-pyrazineacetonitriles having the general formula:

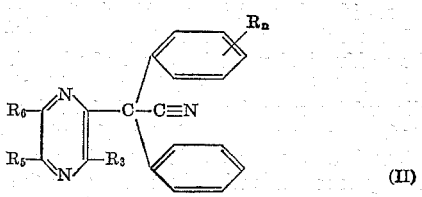

(II)

in which $R_3$, $R_5$, $R_6$ and $R_n$ have the above defined meaning. These compounds can be prepared as described in our co-pending application of even date herewith. The compounds of Formula II are saponified to the corresponding carboxylic acids, which acids are decarboxylated (mostly in one and the same operation with the saponification), yielding diphenylpyrazylmethanes.

In order to prepare compounds of the Formula I, in which $R_1$ and $R_4$ both represent hydrogen atoms, or both the same alkyl radical, the diphenylpyrazylmethanes are reduced catalytically in a suitable solvent (acetic acid; a mixture of methanol and acetic acid) yielding corresponding 2-benzhydrylpiperazines. Alkylation of these piperazines yields the 1,4-dialkyl-2-benzhydrylpiperazines. It is to be noted, however, that alkylation with alkylhalides is not a suitable method for this kind of compounds, since the possible quaternization results in the production of a mixture of tertiary amines and quaternary ammonium halides. Better methods are the alkylation with a suitable oxo-compound in the presence of a reducing agent, as for instance formaldehyde and formic acid, or the acylation of the piperazines with a suitable alkylcarboxylic acid derivative to a 1,4-diacyl-2-benzhydrylpiperazine, followed by reduction of both acyl groups, for instance with the aid of lithium aluminum hydride.

In order to prepare piperazines of Formula I, in which $R_1$ and $R_4$ are different from each other, the diphenylpyrazylmethanes are first reacted with a suitable alkylhalide to form a mono-quaternary ammonium halide, which compound is catalytically hydrogenated to the N-monoalkyl-2-benzhydrylpiperazine. Naturally, these monoalkylpiperazines can be alkylated again, yielding 1,4-dialkyl-2-benzhydrylpiperazines in which $R_1$ and $R_4$ represent different alkyl groups.

The following examples serve to illustrate the invention. All temperatures are given in degrees centigrade. The melting points are all uncorrected.

Example 1

Subsequently, 5.2 grams (0.019 mole) of $\alpha,\alpha$-diphenyl 2-pyrazineacetonitrile, a solution of 5.6 grams (0.1 mole) of potassium hydroxide in 8.5 cc. of water, and 25 cc. of methanol are introduced into an autoclave of 250 cc. capacity. The autoclave is closed and slowly heated while shaking to a temperature of about 210°–220°. This temperature should be reached after two hours and then the autoclave is kept at this temperature under constant shaking for eleven hours. After cooling, the contents of the autoclave is poured out and the solvents are evaporated until the residue is nearly dry. This residue is distributed between water and chloroform. The aqueous layer is separated, nearly saturated with potassium carbonate, and then extracted with chloroform. The combined chloroform layers are dried with magnesium sulphate and after filtration the chloroform is evaporated. The residue obtained is recrystallized from methanol.

To a solution of 2.9 grams (0.012 mole) of the 2-benzhydrylpyrazine thus obtained (M.P. 104°–105°) in 13 cc. of glacial acetic acid 0.081 gram of platinum oxide are added and this mixture is hydrogenated at atmospheric pressure while shaking at a temperature of 40°, until 0.036 mole of hydrogen are absorbed. After completion of the hydrogenation the solution is filtered to remove the catalyst, and the filtrate is evaporated to dryness under reduced pressure. The residue is taken up in acetone and after filtration 5 cc. of alcoholic hydrogen chloride are added. The precipitate obtained is collected on a filter and washed with acetone. The hydrochloric acid salt thus obtained is recrystallized from 3 N hydrochloric acid or from a mixture of ethanol and ether, yielding pure 2-benzhydrylpiperazine dihydrochloride containing half a mole of crystallization water, melting at 352°–353°.

Example 2

In the same way as described in Example 1, starting from $\alpha,\alpha$-diphenyl-3-ethyl 2-pyrazineacetonitrile, however, 2-benzhydryl-3-ethylpiperazine dihydrochloride is obtained with melting point 272°–278°. The crystals contain one mole of crystallization water.

Example 3

In the same way as described in Example 1, starting from 5,6-dimethyl-$\alpha,\alpha$-diphenyl 2-pyrazineacetonitrile, however, 2-benzhydryl-5,6-dimethylpiperazine dihydrochloride is obtained. The crystals contain one mole of crystallization water and appear in two stereoisomeric forms, with melting points of 203°–225° and 290°–295°.

Example 4

In the same way as described in Example 1, starting from $\alpha$-(4-methoxyphenyl)-$\alpha$-phenyl 2-pyrazineacetonitrile, however, 2-(4-methoxybenzhydryl)piperazine dihydrochloride, M.P. 282°–283°, is obtained. The crystals contain half a mole of crystallization water.

Example 5

In the same way as described in Example 1, starting from α-(4-chlorophenyl)-α-phenyl 2 - pyrazineacetonitrile, however, 2-(4-chlorobenzhydryl)piperazine dihydrochloride, M.P. 318°–320°, is obtained.

*Example 6*

A solution of 15 grams (0.06 mole) of 2-benzhydrylpyrazine, obtained according to the first paragraph of Example 1, in 200 cc. of dry ether is mixed with 75 cc. of methyl iodide and the mixture obtained is refluxed for 14 days. The mixture is allowed to cool and the crystals formed are collected on a filter and recrystallized from a mixture of methanol and ether. The 2-benzhydrylpyrazine-4-methiodide thus obtained is converted into the corresponding 4-methochloride by interaction with freshly precipitated silver chloride. The 15 grams of 2-benzhydrylpyrazine-4-methochloride obtained are hydrogenated in glacial acetic acid with platinum oxide as a catalyst and at atmospheric pressure, and further treated in the same way as described in Example 1, second paragraph, yielding 2-benzhydryl-4-methylpiperazine dihydrochloride, which after recrystallization from iso-butanol starts to melt under decomposition at 270°. The crystals contain one mole of crystallization water.

*Example 7*

A solution of 10 grams (0.036 mole) of 2-benzhydryl-5,6-dimethylpyrazine, obtained according to the first part of Example 3, in 200 cc. of dry ether is mixed with 75 cc. of methyl iodide and the mixture is left standing at room temperature for 20 days. The crystals formed are filtered off and treated in the same way as described in Example 6, yielding 2-benzhydryl-4,5,6-trimethylpiperazine dihydrochloride, M.P. 265°–267°. The crystals contain half a mole of crystallization water.

*Example 8*

A solution of 10 grams (0.025 mole) of 2-benzhydryl-5,6-diphenylpyrazine, prepared by saponification and decarboxylation of 5,6,α,α-tetraphenyl 2-pyrazineacetonitrile in the manner as described in the first paragraph of Example 1, in 130 cc. of dry ether is mixed with 60 cc. of methyl iodide and the mixture is left standing at room temperature for one month, after which it is refluxed for 26 days. On cooling, the crystals are collected on a filter and recrystallized from methanol. The 2-benzhydryl-5,6-diphenylpyrazine-4-methiodide obtained is treated in the manner as described in Example 6, yielding 2-benzhydryl-5,6-diphenyl-4-methylpiperazine dihydrochloride, which melts under decomposition at 143°–146° after recrystallization from methylethylketone. The crystals contain half a mole of crystallization water.

*Example 9*

A mixture of 5 grams (0.015 mole) of 2-benzhydrylpiperazine dihydrochloride (+½H₂O) obtained according to Example 1, 2.04 grams (0.03 mole) of sodium formate, 11.5 cc. of a 33 percent formaldehyde solution (containing 0.14 mole of formaldehyde) and 12.7 cc. of an 85 percent formic acid solution (containing 0.28 mole of formic acid) is refluxed for 18 hours. The mixture is allowed to cool and then made alkaline and extracted several times with ether. The ether solution is separated and dried. To this dry solution an excess of alcoholic hydrogen chloride is added and the crystals obtained are purified by recrystallization from a mixture of ethanol and ether. The 2-benzhydryl-1,4-dimethylpiperazine dihydrochloride obtained contains one mole of crystallization water and melts at 200°–228° under decomposition.

*Example 10*

In the same way as described in Example 9, starting from 2-benzhydryl-3-ethylpiperazine dihydrochloride obtained according to Example 2, however, 2-benzhydryl-1,4 - dimethyl-3-ethylpiperazine dihydrochloride is obtained, which contains one mole of crystallization ethanol and begins to sinter at 110°, but melts at 195°.

*Example 11*

In the same way as described in Example 9, starting from 2-benzhydryl-5,6-dimethylpiperazine dihydrochloride obtained according to Example 3, however, 2-benzhydryl-1,4,5,6-tetramethylpiperazine dihydrochloride is obtained, melting at 244°–245°.

*Example 12*

In the same way as described in Example 9, starting from 2-(4-chlorobenzhydryl)piperazine dihydrochloride obtained according to Example 5, however, 2-(4-chlorobenzhydryl)-1,4-dimethylpiperazine dihydrochloride is obtained, which contains one mole of crystallization water and half a mole of crystallization ethanol, and which starts to melt under decomposition at 150°.

*Example 13*

2-benzhydrylpiperazine dihydrochloride (containing half a mole of crystallization water) obtained according to Example 1, is dissolved in water, the solution is made alkaline and extracted with chloroform or ether. After evaporation of the organic solvent, 2-benzhydrylpiperazine is obtained. A solution of 4.52 grams (0.018 mole) of this product in 15 cc. (0.14 mole) of acetic acid anhydride is refluxed for 75 minutes and allowed to cool. Thereupon the excess of solvent is evaporated under reduced pressure, the crystals obtained are dissolved in a mixture of equal parts of ethanol and water, and the solution is treated with decolourizing carbon and filtered. After evaporation of the alcohol, crystals of 1,4-diacetyl-2-benzhydrylpiperazine are obtained with M.P. 182°–184°.

A solution of 3.95 grams (0.012 mole) of this compound in 100 cc. of dry benzene is dropwise added to a suspension of 1.3 grams (0.034 mole) of lithiumaluminumhydride in 100 cc. of dry ether while stirring. The mixture obtained is refluxed for six hours and allowed to cool. Thereupon 1.5 cc. of water followed by 1.5 cc. of 4 N sodium hydroxide solution are added. After addition of another 5 cc. of water the organic layer is filtered and extracted several times with 4 N hydrochloric acid. The combined aqueous layers are made alkaline with 4 N sodium hydroxide solution and extracted several times with ether. The combined ether layers are dried and the solvent is evaporated under reduced pressure. The residue is dissolved in 5 cc. of ethanol, an equivalent amount of 48 percent hydrobromic acid solution is added, followed by some benzene, and the solvents are evaporated. A new amount of ethanol and benzene is added and again evaporated. This procedure is repeated until a non-aqueous suspension in benzene of the 1,4-diethyl-2-benzhydrylpiperazine dihydrobromide containing half a mole of crystallization water, is obtained. The product is very hygroscopic and melts under decomposition at 142°–172°.

What is claimed is:

1. A piperazine derivative selected from the group consisting of 2-benzhydryl-4-methylpiperazine, 2-benzhydryl-1.4-dimethylpiperazine and their acid addition salts.
2. The piperazine derivative 2-benzhydryl-4-methylpiperazine dihydrochloride.
3. The piperazine derivative 2-benzhydryl-1.4-dimethylpiperazine dihydrochloride.

References Cited in the file of this patent

UNITED STATES PATENTS 2,843,589    Scigliano et al. _____ July 15, 1958

FOREIGN PATENTS 578,342    Great Britain _____ June 25, 1946

OTHER REFERENCES

Fieser et al.: Organic Chemistry, pages 226–227 (1950), 2nd edition.

Pollard et al.: Jour. Amer. Chem. Soc., vol. 75, pages 2989–2990 (1953).